United States Patent
Hsieh et al.

(10) Patent No.: US 11,314,313 B2
(45) Date of Patent: Apr. 26, 2022

(54) SCREEN CASTING

(71) Applicant: HEWLETT-PACKARD DEVELOPMENT COMPANY, L.P., Houston, TX (US)

(72) Inventors: YK Hsieh, Taipei (TW); Han-Kuang Chang, Taipei (TW); Chung-Chun Chen, Taipei (TW); Leo Joseph Gerten, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 394 days.

(21) Appl. No.: 16/325,285

(22) PCT Filed: Oct. 19, 2016

(86) PCT No.: PCT/US2016/057701
§ 371 (c)(1),
(2) Date: Feb. 13, 2019

(87) PCT Pub. No.: WO2018/075029
PCT Pub. Date: Apr. 26, 2018

(65) Prior Publication Data
US 2021/0303058 A1 Sep. 30, 2021

(51) Int. Cl.
*G06F 1/3234* (2019.01)
*G06F 1/3218* (2019.01)
(Continued)

(52) U.S. Cl.
CPC .......... *G06F 1/3265* (2013.01); *G06F 1/3218* (2013.01); *G06F 1/3228* (2013.01);
(Continued)

(58) Field of Classification Search
CPC .... G06F 1/3265; G06F 1/3228; G06F 1/3218; G09G 3/3406; G09G 2370/06;
(Continued)

(56) References Cited

U.S. PATENT DOCUMENTS 7,389,432 B2   6/2008   Chandley et al.
8,358,298 B2   1/2013   Lee et al.
(Continued)

FOREIGN PATENT DOCUMENTS

CN   102057572 A   5/2011
CN   104714809 A   6/2015
(Continued)

OTHER PUBLICATIONS

Save Battery by Mirroring Your Android Screen to Chromecast with the Display Off, Aug. 16, 2014 < http://cord-cutters.wonderhowto.com/how-to/save-battery-by-mirroring-your-android-screen-chromecast-with-display-off-0156722/ >.

*Primary Examiner* — Brent D Castiaux
(74) *Attorney, Agent, or Firm* — HPI Patent Department

(57) ABSTRACT

Screen casting on between two devices is described. In an example implementation, a communication link is established by a first device with a second device for casting a screen of the second device on the first device. Upon establishing the communication link, a command message is sent by the first device to the second device to set a backlight of the screen of the second device based on user backlight settings. When no user activity is detected on the second device for a specific time period, a request message is received by the first device from the second device, indicating switching the backlight of the screen of the second device to power-saving backlight settings. In response to the request message, a command message is sent by the first device to the second device to set the backlight of the screen of the second device based on the power-saving backlight settings.

15 Claims, 8 Drawing Sheets

(51) Int. Cl.
*G06F 1/3228* (2019.01)
*G09G 3/34* (2006.01)
*H04N 21/442* (2011.01)

(52) U.S. Cl.
CPC ..... *G09G 3/3406* (2013.01); *H04N 21/44222* (2013.01); *G09G 2330/021* (2013.01); *G09G 2354/00* (2013.01); *G09G 2370/06* (2013.01)

(58) Field of Classification Search
CPC ......... G09G 2354/00; G09G 2330/021; Y02D 10/00; H04N 21/4436; H04N 21/00; H04N 21/4122; H04N 21/41407; H04N 21/44222; H04N 21/44231
See application file for complete search history.

(56) References Cited

U.S. PATENT DOCUMENTS

| | | |
|---|---|---|
| 2004/0257337 A1 | 12/2004 | Shibamiya et al. |
| 2006/0076385 A1 | 4/2006 | Etter et al. |
| 2008/0304433 A1 | 12/2008 | Lida et al. |
| 2009/0303097 A1* | 12/2009 | Reams ................ H03J 1/0025 341/176 |
| 2010/0261506 A1 | 10/2010 | Rajamani et al. |
| 2010/0262673 A1 | 10/2010 | Chang et al. |
| 2014/0189395 A1 | 7/2014 | KP |
| 2014/0223490 A1* | 8/2014 | Pan ................ H04N 21/41265 345/173 |
| 2014/0320750 A1 | 10/2014 | Chen |
| 2014/0372620 A1 | 12/2014 | Vedula et al. |
| 2015/0082058 A1* | 3/2015 | Hahm ................ G06F 1/3234 713/320 |
| 2016/0249006 A1 | 8/2016 | Park et al. |

FOREIGN PATENT DOCUMENTS

| | | |
|---|---|---|
| CN | 104967886 A | 10/2015 |
| CN | 105323516 A | 2/2016 |
| CN | 105578227 A | 5/2016 |
| EP | 2963889 A1 | 1/2016 |
| KR | 10-2016-0016335 A | 2/2016 |
| TW | 201441753 A | 11/2014 |

* cited by examiner

SCREEN CASTING

BACKGROUND

Electronic devices, such as smartphones and personal computers, may be connected with each other for the purpose of casting screens. Casting a screen also referred to as mirroring the screen, of a first device on to a second device renders contents displayed on the screen of the first device on to a screen of the second device. In an example, a screen of a smartphone may be casted on a bigger-screen device, such as a laptop, to allow a user to access or view the contents of the smartphone, for example, videos, on the bigger screen of the laptop.

BRIEF DESCRIPTION OF DRAWINGS

The following detailed description references the drawings, wherein.

DETAILED DESCRIPTION

Figure 1:
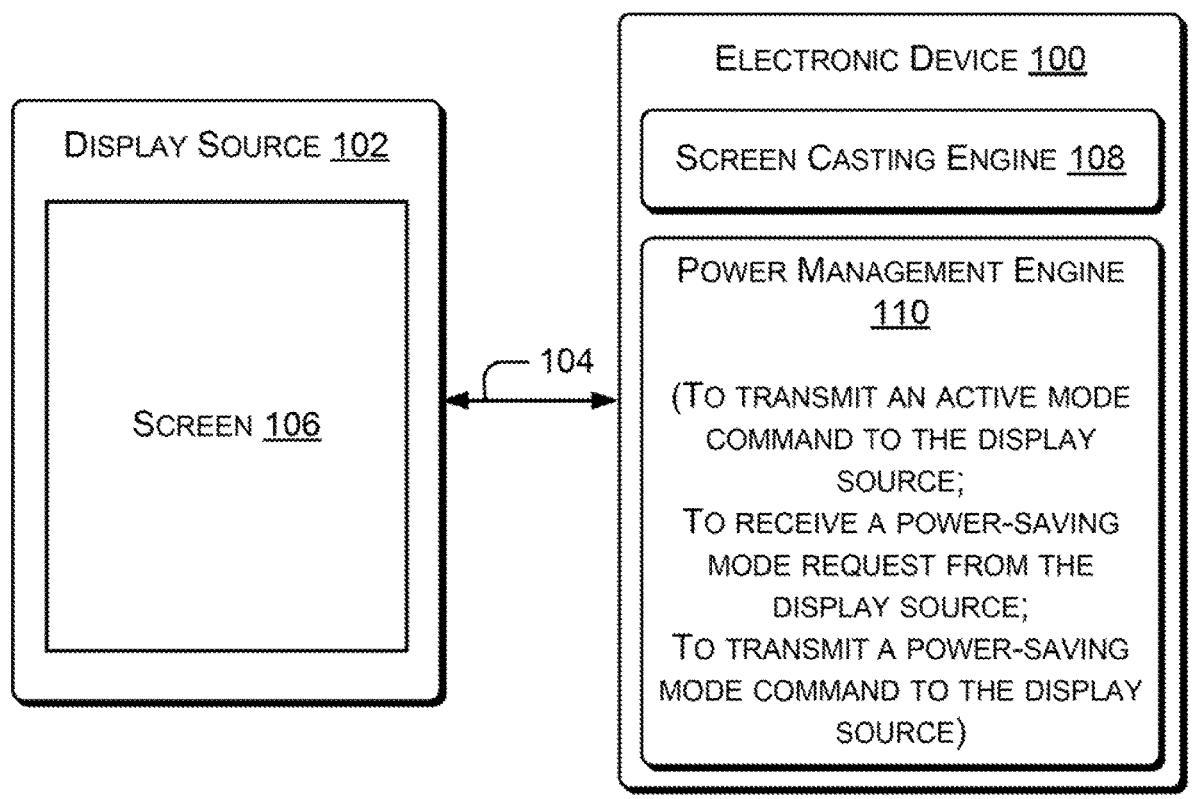
FIG. 1 illustrates a block diagram of an electronic device coupled to a display source for screen casting, according to an example of the present subject matter.

Casting a screen of a device on to another device involves streaming signals, associated with contents displayed on the screen, to the other device. The device whose screen is casted may be referred to as a display source, and the device on to which the screen is casted may be referred to as a display sink. During casting of the screen, any change to the contents displays on the screen of the display source is mirrored on the screen casted on the display sink.

While the screen of the display source is being casted on the display sink, the screen of the display source is ON. In other words, the display source retains original backlight settings, for example, 100% lit, for its screen throughout while casting the screen. Thus, even though a user is viewing the contents on the screen casted on the display sink and not performing an activity on the display source, the screen of the display source is ON. An electronic device consumes more power when a screen of the electronic device is ON. Thus, display sources experience high power consumption during casting of their screens. High power consumption in a display source, such as a smartphone or a tablet, leads to faster depletion of an internal power source, for example, a battery, of the display source. This may adversely affect user experience during screen casting. The user may have to provide a continuous power supply to the display source if the screen is to be casted for a long time.

The present subject matter describes approaches for casting screens of display sources on display sinks. The approaches of the present subject matter are based on dynamically controlling backlight settings of a screen of a display source and controlling streaming of screen casting signals from the display source while the screen of the display source is being casted on a display sink. The approaches of the present subject matter facilitate in reducing power consumption in the display source during screen casting.

According to an example implementation of the present subject matter, while a display source is coupled to a display sink for screen casting, the display source can be set in one of the following modes: (1) Active mode; (2) Power-saving mode; and (3) Sleep mode. In Active mode, a signal stream associated with casting of the screen of the display source is transmitted and the backlight of the screen of the display source is set based on user backlight settings. The user backlight settings may indicate backlight settings, for example, 100% lit, as defined by a user prior to screen casting. In Power-saving mode, the signal stream associated with casting of the screen of the display source is transmitted and the backlight of the screen of the display source is set based on power-saving backlight settings. The power-saving backlight settings may indicate backlight settings of, for example, 0% lit. In Sleep mode, the signal stream associated with casting of the screen of the display source is stopped or paused and the backlight of the screen of the display source is set based on the power-saving backlight settings.

In an example implementation, a communication link may be established between a display source and a display sink for transmitting a signal stream for casting a screen of the display source on the display sink. The signal stream may also refer to the screen casting stream associated with the screen of the display source. Upon establishing the communication link, a command is sent by the display sink to the display source to set the display source in Active mode. When no user activity is detected on the display source for a specific time period, for example, 30 seconds, a request is sent by the display source to the display sink for putting the display source in Power-saving mode. In response to such a request from the display source, a command is sent by the display sink to the display source to set the display source in Power-saving mode. As and when a user activity is detected on the display source while being in Power-saving mode, a request is sent by the display source to the display sink for putting the display source back in Active mode. In response to such a request from the display source, a command is sent by the display sink to the display source to set the display source back in Active mode.

Further, while the display source is in Power-saving mode, when no user activity is detected on the display sink for a specific time period, for example, 30 seconds, and the frame of the casted screen in the display sink is static, then a command is sent by the display sink to the display source to set the display source in Sleep mode. The frame of the casted screen may be static, for example, when no video is playing on the display source and therefore no video signal is streamed to the display sink for casting the screen. As and when a user activity is detected on the display sink while the display source is in Sleep mode, a command is sent by the display sink to the display source to set the display source back in Power-saving mode and accordingly restart the signal stream associated with casting of the screen of the display source.

Further, while the display source is in Sleep mode, when a user activity is detected on the display source, then a request is sent by the display source to the display sink, for putting the display source in Active mode. In response to such a request from the display source, a command is sent by the display sink to the display source to set the display source in Active mode and accordingly restart the signal stream associated with casting of the screen of the display source.

Controlling backlight settings of the screen of the display source and controlling streaming of screen casting signals from the display source while the screen of the display source is being casted on the display sink, facilitates in reducing power consumption in the display source. Also, reducing the backlight of the screen of the display source, for example, to 0% in Power-saving mode helps in providing security to the contents on the screen of the display source from being viewed by others who are in the vicinity of the display source.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of an electronic device 100 coupled to a display source 102 for screen casting, according to an example of the present subject matter. The electronic device 100 may be coupled to the display source 102 through a communication link 104 to receive a screen casting stream associated with a screen 106 of the display source 102. The communication link 104 may be a wireless or a wired communication link. The electronic device 100, based on the screen casting stream received from the display source 102, may display contents on a screen (not shown) of the electronic device 100 that mirror the contents on the screen 106 of the display source 102. The electronic device 100 may be referred to as a display sink. In an example implementation, the electronic device 100 and the display source 102 may include laptops, smartphones, tablets, and the like.

As shown in FIG. 1, the electronic device 100 includes a screen casting engine 108 and a power management engine 110. In an example implementation, the display source 102 may include a streaming engine (not shown) and a display setting engine (not shown). The screen casting engine 108, the power management engine 110, the streaming engine, and the display setting engine may collectively be referred to as engine(s) which can be implemented through a combination of any suitable hardware and computer-readable instructions. The engine(s) may be implemented in a number of different ways to perform various functions for the purposes of casting the screen 106 of the display source 102 on to the electronic device 100. For example, the computer-readable instructions for the engine(s) may be processor-executable instructions stored in a non-transitory computer-readable storage medium, and the hardware for the engine(s) may include a processing resource (e.g., processor(s)), to execute such instructions. In the present examples, the non-transitory computer-readable storage medium stores instructions which, when executed by the processing resource, implements the engine(s). The electronic device 100 and the display source 102 may include the non-transitory computer-readable storage medium storing the instructions and the processing resource (not shown) to execute the instructions. In an example, the non-transitory computer-readable storage medium storing the instructions may be external, but accessible to the processing resource of the electronic device 100 and the display source 102. In another example, the engine(s) may be implemented by electronic circuitry.

The processing resource of the electronic device 100 and the display source 102 may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the electronic device 100 and the display source 102. The non-transitory computer-readable storage medium may include, for example, volatile memory (e.g., RAM), and/or non-volatile memory (e.g., EPROM, flash memory, NVRAM, memristor, etc.).

The description hereinafter describes a procedure of casting contents of the screen 106 of the display source 102 on to a screen of the electronic device 100 in accordance with an example implementation. Example implementations of the present subject matter are described with reference to the electronic device 100 and the display source 102. The procedure can be implemented in a similar manner for casting a screen of any other display source on to any other display sink.

The procedure of casting the screen 106 includes dynamically controlling backlight settings of the screen 106 and controlling screen casting streams from the display source 102 to the electronic device 100. According to an example implementation of the present subject matter, during casting of the screen 106, the display source 102 can be set in one of the following modes: (1) Active mode; (2) Power-saving mode; and (3) Sleep mode. In Active mode, the screen casting stream is transmitted from the display source 102 to the electronic device 100 and the backlight of the screen 106 is set based on user backlight settings. The user backlight settings for the backlight may indicate the intensity of backlight defined by a user prior to screen casting. In an example, the user backlight settings can be high backlight settings (100% lit), medium backlight settings (75% lit), or low backlight settings (50% lit). In Power-saving mode, the screen casting stream is transmitted from the display source 102 to the electronic device 100 and the backlight of the screen 106 is set based on power-saving backlight settings. The power-saving backlight settings for the backlight may indicate zero intensity of backlight (0% lit). In Sleep mode, the screen casting stream from the display source 102 to the electronic device 100 is stopped or paused, and the backlight of the screen 106 is set based on the power-saving backlight settings. The information associated with the user backlight settings and the power-saving backlight settings may be stored in the display source 102, and the information associated with the mode in which the display source 102 is set at any time instance, may be stored in the electronic device 100.

In an example implementation, the screen casting engine 108 of the electronic device 100 may establish a communication link with the display source 102 for casting the screen 106 of the display source 102 on the electronic device 100. The communication link may be the communication link 104, and may include a wireless or wired link. The screen casting engine 108 may establish the communication link based on a communication request received from the display source 102. The screen casting engine 108 may transmit an acknowledgement message to the display source 102 to confirm that the communication link is established for casting the screen 106.

Upon establishing the communication link with the display source 102, the screen casting engine 108 transmits an active mode command to the display source 102. The active mode command is indicative of setting the display source 102 in Active mode, and thus transmitting the screen casting stream associated with the screen 106 to the electronic device 100 and setting the backlight of the screen 106 based on the user backlight settings. In an example implementation, Active mode may be an initial default mode for the display source 102. The display source 102 receives the active mode command. Accordingly, the streaming engine of the display source 102 transmits the screen casting stream associated with the screen 106 to the electronic device 100, and the display setting engine of the display source 102 sets the backlight of the screen 106 to the user backlight settings. The screen casting engine 108 may receive the screen casting stream, and accordingly render a display associated with the received stream on the screen of the electronic device 100.

When no user activity is detected on the display source 102 for a specific time period, for example, 30 seconds, the display source 102 transmits a power-saving mode request to the electronic device 100. No user activity on the display source 102 may be detected when the display source 102 is not operated by the user. The power-saving mode request is indicative of switching the backlight of the scram 106 from the user backlight settings to the power-saving backlight settings. The power management engine 110 of the electronic device 100 receives the power-saving mode request from the display source 102. In response to the power-saving mode request, the power management engine 110 transmits a power-saving mode command to the display source 102. The power-saving mode command is indicative of setting the display source 102 in Power-saving mode, and thus setting the backlight of the screen 106 based on the power-saving backlight settings while continuing to transmit the screen casting stream associated with the screen 106. The display source 102 receives the power-saving mode command. Accordingly, the streaming engine of the display source 102 continues to transmit the screen casting stream to the electronic device 100, and the display setting engine of the display source 102 sets the backlight of the screen 106 to the power-saving backlight settings.

Further, when user activity is detected on the display source 102 while the backlight of the screen 106 is based on the power-saving backlight settings, the display source 102 transmits an active mode request to the electronic device 100. The user activity on the display source 102 may include an input provided by the user though an input/output device, for example, a keypad or touch-sensitive unit, to operate the display source 102. The active mode request is indicative of switching the backlight of the screen 106 from the power-saving backlight settings to the user backlight settings. The power management engine 110 of the electronic device 100 receives the active mode request from the display source 102. In response to the active mode request, the power management engine 110 transmits an active mode command to the display source 102. The active mode command is indicative of setting the display source 102 in Active mode, and thus setting the backlight of the screen 106 based on the user backlight settings while continuing to transmit the screen casting stream. The display source 102 receives the active mode command. Accordingly, the display setting engine of the display source 102 sets the backlight of the screen 106 to the user backlight settings, while the streaming engine of the display source 102 continues to transmit the screen casting stream to the electronic device 100.

Further, in an example implementation, the screen casting engine 108 may monitor user activity on the casted screen in the electronic device 100. The user activity on the casted screen in the electronic device 100 may include an input provided by the user though an I/O device, for example, a keypad or touch-sensitive unit, to operate the casted screen in the electronic device 100. The screen casting engine 108 may also monitor movement of frames of the casted screen in the electronic device 100. Frames of the casted screen may move when an audio/video file is being played on the display source 102.

In an example implementation, when the screen casting engine 108 determines absence of user activity on the casted screen in the electronic device 100 for a specific time period, for example, 30 seconds, and also determines that a frame of the casted screen in the electronic device 100 is static while the backlight of the screen 106 is based on the power-saving backlight settings, the power management engine 110 transmits a sleep mode command to the display source 102. The absence of user activity may be determined when there is no activity on the casted screen from the user through the I/O device, or when the casted screen is idle or minimized. The sleep mode command is indicative of setting the display source 102 in Sleep mode, and thus stopping or pausing the screen casting stream from the display source 102, and setting the backlight of the screen 106 based on the power-saving backlight settings. The display source 102 receives the sleep mode command. Upon receiving the sleep mode command, the streaming engine of the display source 102 stops or pauses the screen casting stream, and the display setting engine of the display source 102 sets the backlight of the screen 106 to the power-saving backlight settings.

Further, when user activity is detected on the casted screen in the electronic device 100 while the display source 102 is in Sleep mode, the power management engine 110 transmits a first stream play command to the display source 102. The first stream play command is indicative of starting or playing the screen casting stream from the display source 102 to the electronic device 100 and setting the backlight of the screen 106 based on the power-saving backlight settings. In other words, the first stream play command may indicate setting the display source 102 in Power-saving mode. The display source 102 receives the first stream play command. Accordingly, the streaming engine of the display source 102 transmits the screen casting stream from the display source 102 to the electronic device 100, and the display setting engine of the display source 102 sets the backlight of the screen 106 to the power-saving backlight settings.

Further, in an example implementation, when user activity is detected on the display source 102 while the backlight of the screen 106 is based on the power-saving backlight settings and the screen casting stream is stopped or paused, the display source 102 transmits an active mode request to the electronic device 100. The active mode request, as described earlier, is indicative of switching the backlight of the screen 106 from the power-saving backlight settings to the user backlight settings. The power management engine 110 of the electronic device 100 receives the active mode request from the display source 102, in response to the active mode request, the power management engine 110 transmits a second stream play command to the display source 102. The second stream play command is indicative of starting or playing the screen casting stream from the display source 102 to the electronic device 100 and setting the backlight of the screen 106 based on the user backlight settings. In other words, the second stream play command may indicate setting the display source 102 in Active mode. The display source 102 receives the second stream play command. Accordingly, the streaming engine of the display source 102 transmits the screen casting stream from the display source 102 to the electronic device 100, and the display setting engine of the display source 102 sets the backlight of the screen 106 to the user backlight settings.

Figure 2A:
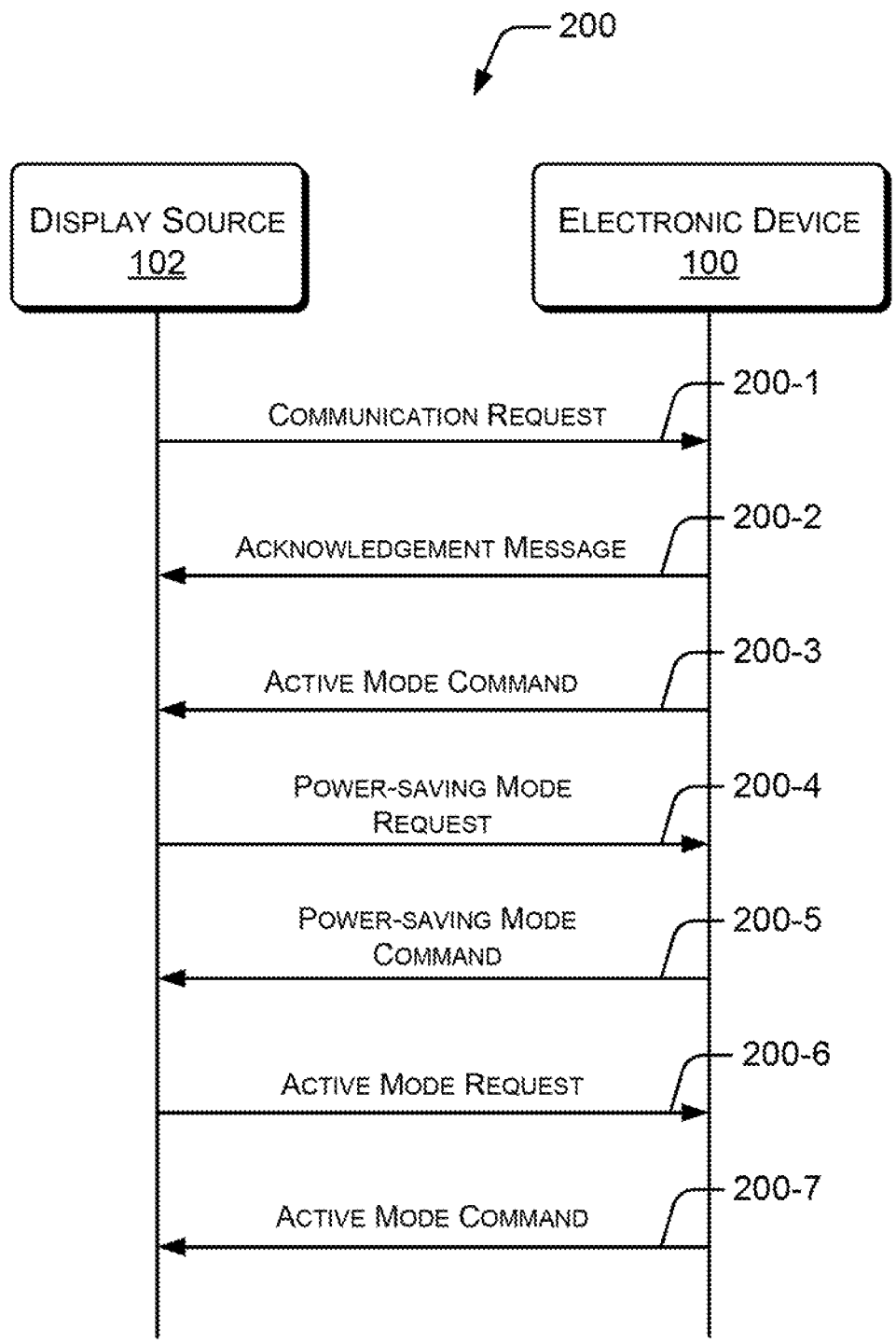
FIG. 2(a) illustrates a flow diagram for communication between the electronic device and the display source to switch the display source between Active mode and Power-saving mode, according to an example of the present subject matter.
Figure 2B:
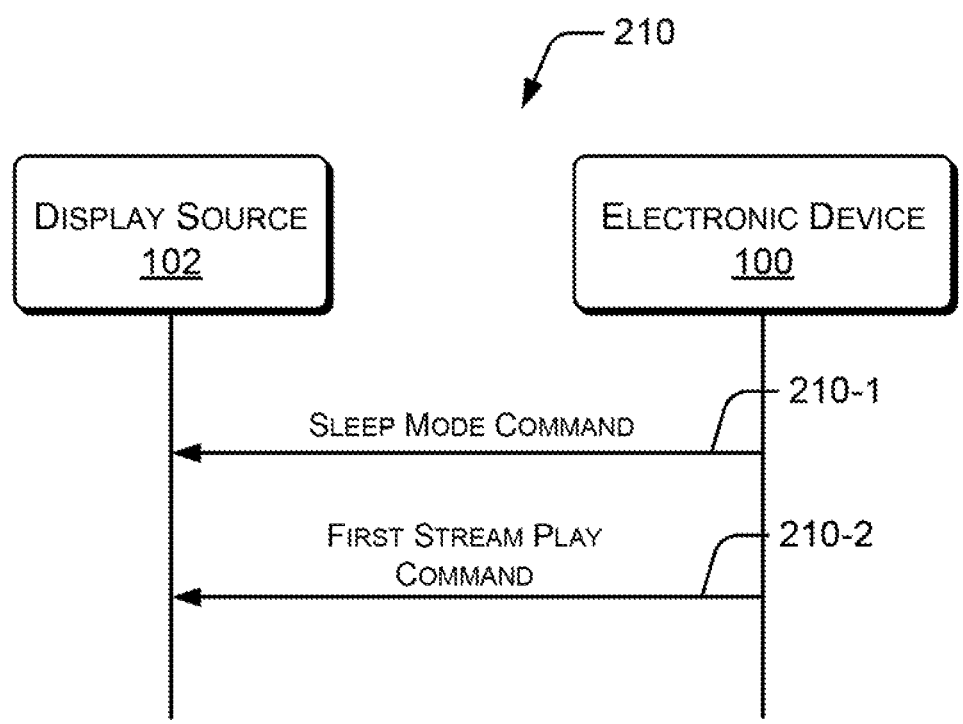
FIG. 2(b) illustrates a flow diagram for communication between the electronic device and the display source to switch the display source between Power-saving mode and Sleep mode, according to an example of the present subject matter.
Figure 2C:
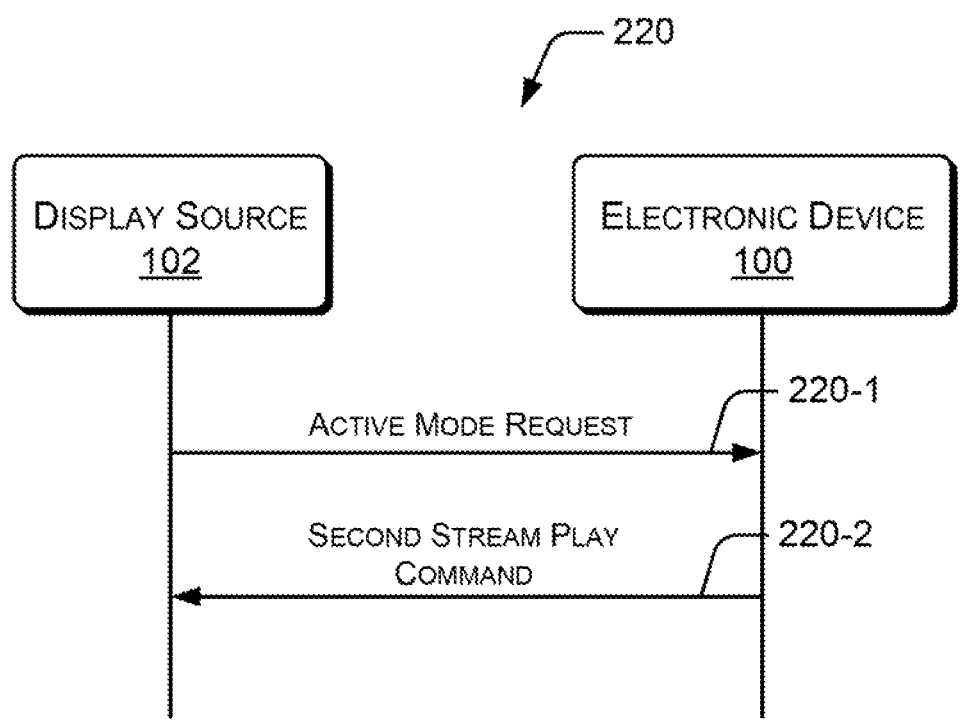
FIG. 2(c) illustrates a flow diagram for communication between the electronic device and the display source to switch the display source from Sleep mode to the Active mode, according to an example of the present subject matter.

FIG. 2(*a*) illustrates a flow diagram 200 for communication between the electronic device 100 and the display source 102 to switch the display source 102 between Active mode and Power-saving mode, according to an example of the present subject matter. Various arrow indicators used in the flow diagram 200 depict transfer of data or messages/signals/commands between the electronic device 100 and the display source 102. The flow diagram 200 shows various arrows pertaining to switching the display source 102 between Active mode and Power-saving mode; however various other communications between the electronic device 100 and the display source 102 and/or other entities may also be part of the flow diagram 200.

In the flow diagram 200, arrow 200-1 represents a communication request sent from the display source 102 to the electronic device 100 for establishing a communication link for casting the screen 106. Arrow 200-2 represents an acknowledgement message from the electronic device 100 to the display source 102 for confirming that the communication link is established. Arrow 200-3 represents an active mode command sent from the electronic device 100 to the display source 102 to set the display source 102 in Active mode. Arrow 200-4 represents a power-saving mode request sent from the display source 102 to the electronic device 100 when no user activity is detected on the display source 102 for a specific time period. Arrow 200-5 represents a power-saving mode command sent from the electronic device 100 to the display source 102 to set the display source 102 in Power-saving mode.

Further, arrow 200-6 represents an active mode request sent from the display source 102 to the electronic device 100 when user activity is detected on the display source 102 while the display source 102 is in Power-saving mode. Arrow 200-7 represents the active mode command sent from the electronic device 100 to the display source 102 to set the display source 102 back in Active mode.

FIG. 2(*b*) illustrates a flow diagram 210 for communication between the electronic device 100 and the display source 102 to switch the display source 102 between Power-saving mode and Sleep mode, according to an example of the present subject matter. Various arrow indicators used in the flow diagram 210 depict transfer of data or messages/signals/commands between the electronic device 100 and the display source 102. The flow diagram 210 shows various arrows pertaining to switching the display source 102 between Power-saving mode and Sleep mode; however various other communications between the electronic device 100 and the display source 102 and/or other entities may also be part of the flow diagram 210.

In the flow diagram 210, arrow 210-1 represents a sleep mode command sent from the electronic device 100 to the display source 102 to set the display source 102 in Sleep mode. The sleep mode command is sent upon determining absence of user activity on the casted screen in the electronic device 100 for a specific time period and upon determining that a frame of the casted screen in the electronic device 100 is static, while the display source 102 is in Power-saving mode. Further, arrow 210-2 represents a first stream play command sent from the electronic device 100 to the display source 102 when user activity is detected on the casted screen in the electronic device while the display source 102 is in Sleep mode. The first stream play command is sent to set the display source 102 in Power-saving mode, i.e., to restart the screen casting stream from the display source 102 to the electronic device 100 and to set the backlight of the screen 106 based on the power-saving backlight settings.

FIG. 2(*c*) illustrates a flow diagram 220 for communication between the electronic device 100 and the display source 102 to switch the display source from Sleep mode to the Active mode, according to an example of the present subject matter. Various arrow indicators used in the flow diagram 220 depict transfer of data or messages/signals/commands between the electronic device 100 and the display source 102. The flow diagram 220 shows various arrows pertaining to switching the display source 102 between Sleep mode and Active mode; however various other communications between the electronic device 100 and the display source 102 and/or other entities may also be part of the flow diagram 220.

In the flow diagram 220, arrow 220-1 represents an active mode request sent from the display source 102 to the electronic device 100 when user activity is detected on the display source 102 while the display source 102 is in Sleep mode. The active mode request is sent to switch the display source 102 to Active mode. Arrow 220-2 represents a second stream play command sent from the electronic device 100 to the display source 102 in response to the active mode request. The second stream play command is sent to set the display source 102 in Active mode, i.e., to restart the screen casting stream from the display source 102 to the electronic device 100 and to set the backlight, of the screen 106 based on the user backlight settings.

Figure 3:
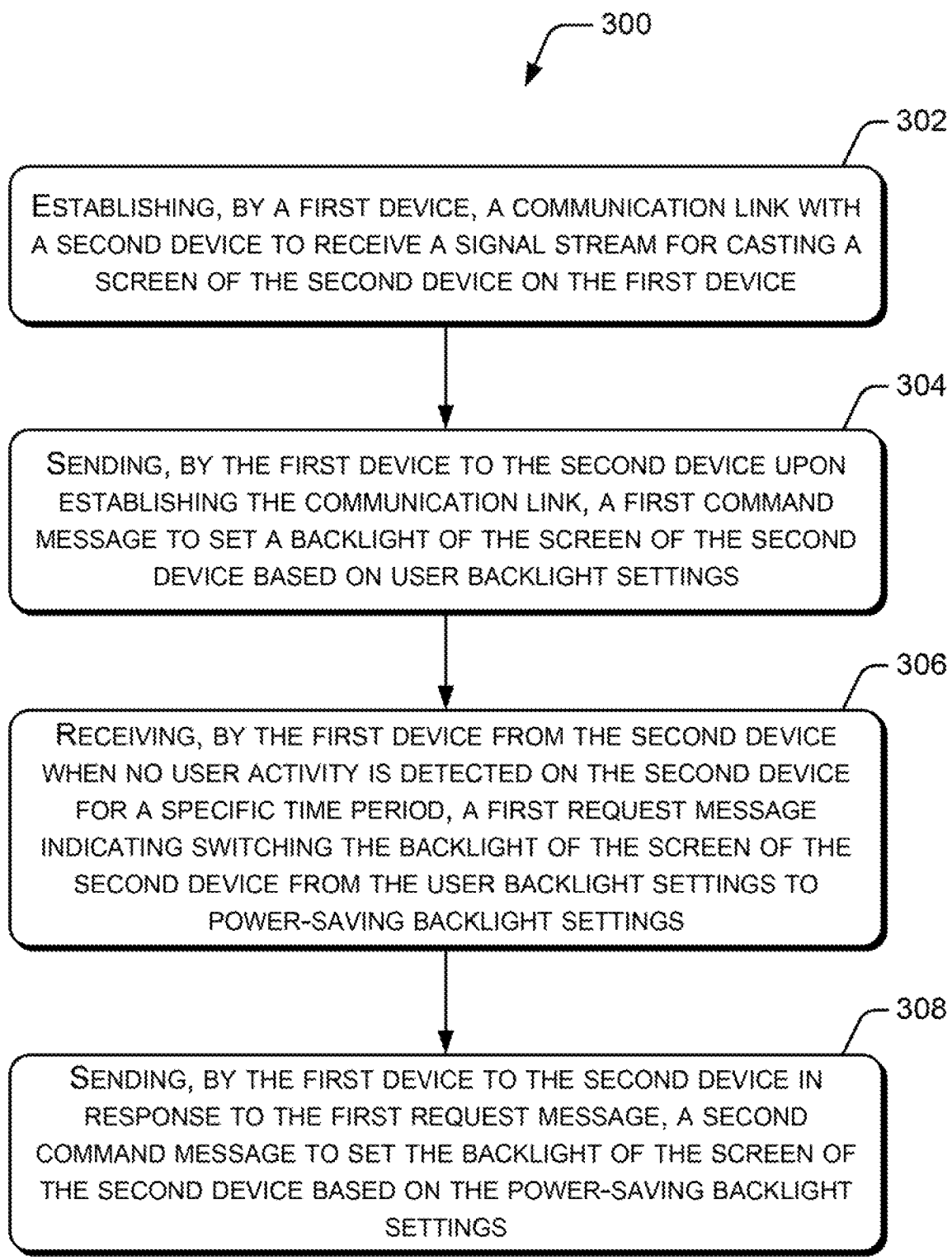
FIG. 3 illustrates a method of casting a screen, according to an example of the present subject matter.

FIG. 3 illustrates a method 300 of casting a screen, according to an example of the present subject matter. The method 300 describes communication between a first device and a second device for casting a screen. The first device is a display sink similar to the electronic device 100 on to which a screen of a display source is casted. The second device is a display source similar to the display source 102 whose screen is casted on the first device. The method 300 can be implemented by processor(s) or device(s) through any suitable hardware, a non-transitory machine readable medium, or a combination thereof. Further, although the method 300 is described in context of the first device and the second device that are similar to the aforementioned devices 100 and 102, other suitable devices or systems may be used for execution of the method 300. In some example implementations, processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a communication link is established by the first device with the second device to receive a signal stream for casting the screen of the second device on the first device. The communication link may be a wired or wireless link established based on a communication request received from the second device. At block 304, upon establishing the communication link, a first command message is sent by the first device to the second device to set a backlight of the screen of the second device based on user backlight settings. The first command message is similar the active mode command as described earlier. The first command message is received by the second device, and accordingly the backlight of the screen of the second device is set to the user backlight settings by the second device.

At block 306, when no user activity is detected on the second device for a specific time period, a first request message is received by the first device from the second device. The first request message indicates switching the backlight of the screen of the second device from the user backlight settings to power-saving backlight settings. The first request message is similar to the power-saving mode request, as described earlier.

At block 308, in response to the first request message, a second command message is sent by the first device to the second device to set the backlight of the screen of the second device based on the power-saving backlight settings. The second command message is similar to the power-saving mode command, as described earlier. The second command message is received by the second device, and accordingly the backlight of the screen of the second device is set to the power-saving backlight settings by the second device.

Further, in an example implementation, when user activity is detected on the second device, a second request message may be received by the first device from the second device. The second request message indicates switching the backlight of the screen of the second device from the power-saving backlight settings to the user backlight settings. The second request message is similar to the active mode request, as described earlier. In response to the second request message, the first command message may be sent by the first device to the second device to set the backlight of the screen of the second device based on the user backlight settings. The first command message is similar to the active mode command, as described earlier. The first command message may be received by the second device, and accordingly the backlight of the screen of the second device may be set to the user backlight settings by the second device.

Figure 4:
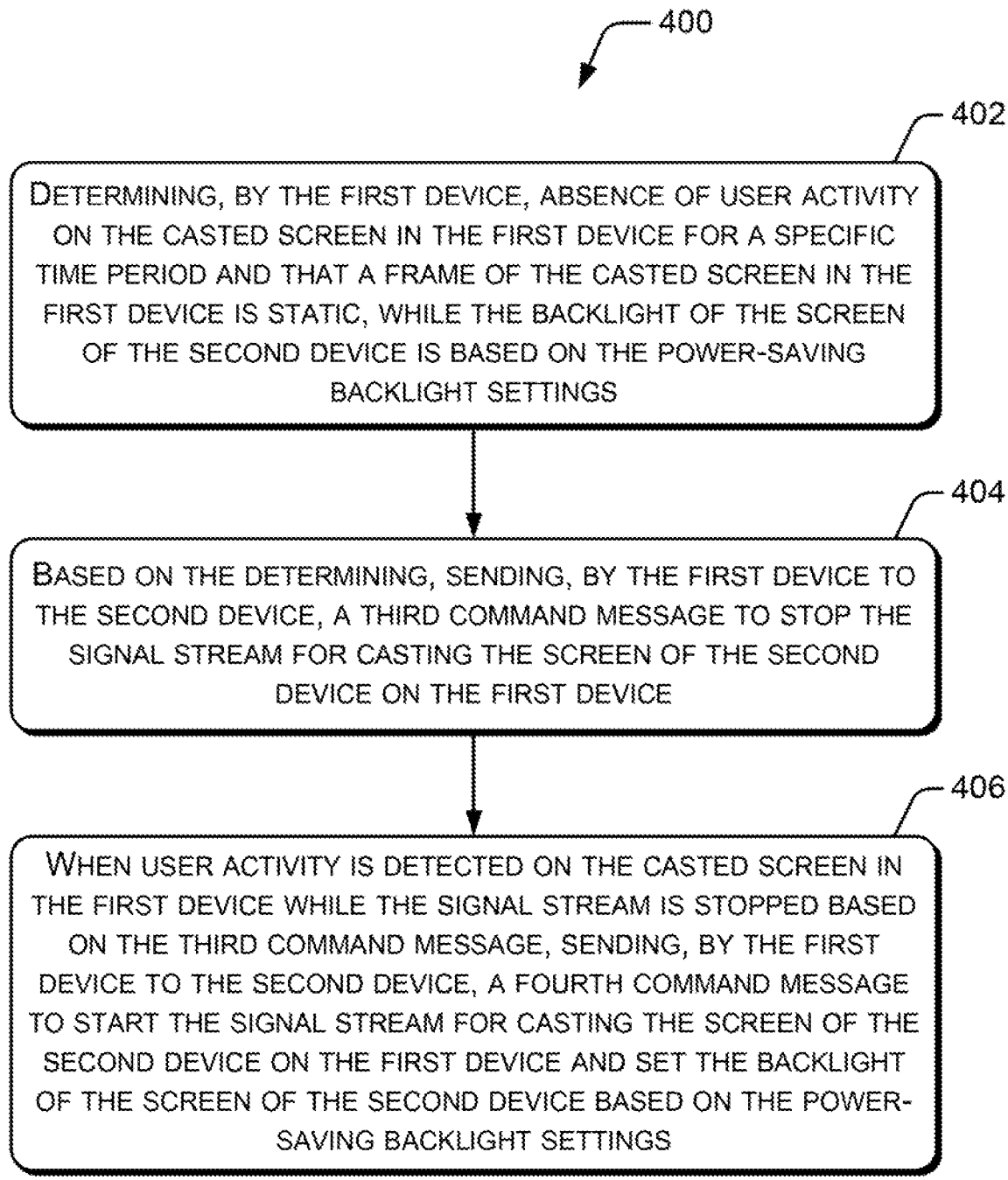
FIG. 4 illustrates a method of casting a screen, according to an example of the present subject matter.

FIG. 4 illustrates a method 400 of casting a screen, according to an example of the present subject matter. The method 400 can be implemented by processor(s) or device(s) through any suitable hardware, a non-transitory machine readable medium, or a combination thereof. Further, although the method 400 is described in context of the first device and the second device of FIG. 3, other suitable devices or systems may be used for execution of the method 400. In some example implementations, processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, while the backlight of the screen of the second device is based on the power-saving backlight settings, the first device may determine absence of user activity on the casted screen in the first device for a specific time period may be determined and determine that a frame of the casted screen in the first device is static. At block 404, based on determining the absence of user activity on the casted screen in, the first device for the specific time period and determining that the frame of the casted screen in the first device is static, a third command message is sent by the first device to the second device. The third command message indicates to stop or pause the signal stream for casting the screen of the second device on the first device. The third command message also indicates to set the backlight of the screen of the second device to the power-saving backlight settings. The third command message is similar to the sleep made command, as described earlier. The third command message is received by the second device, and accordingly the signal stream is stopped or paused and the backlight of the screen of the second device is set to the power-saving backlight settings by the second device.

Figure 5:
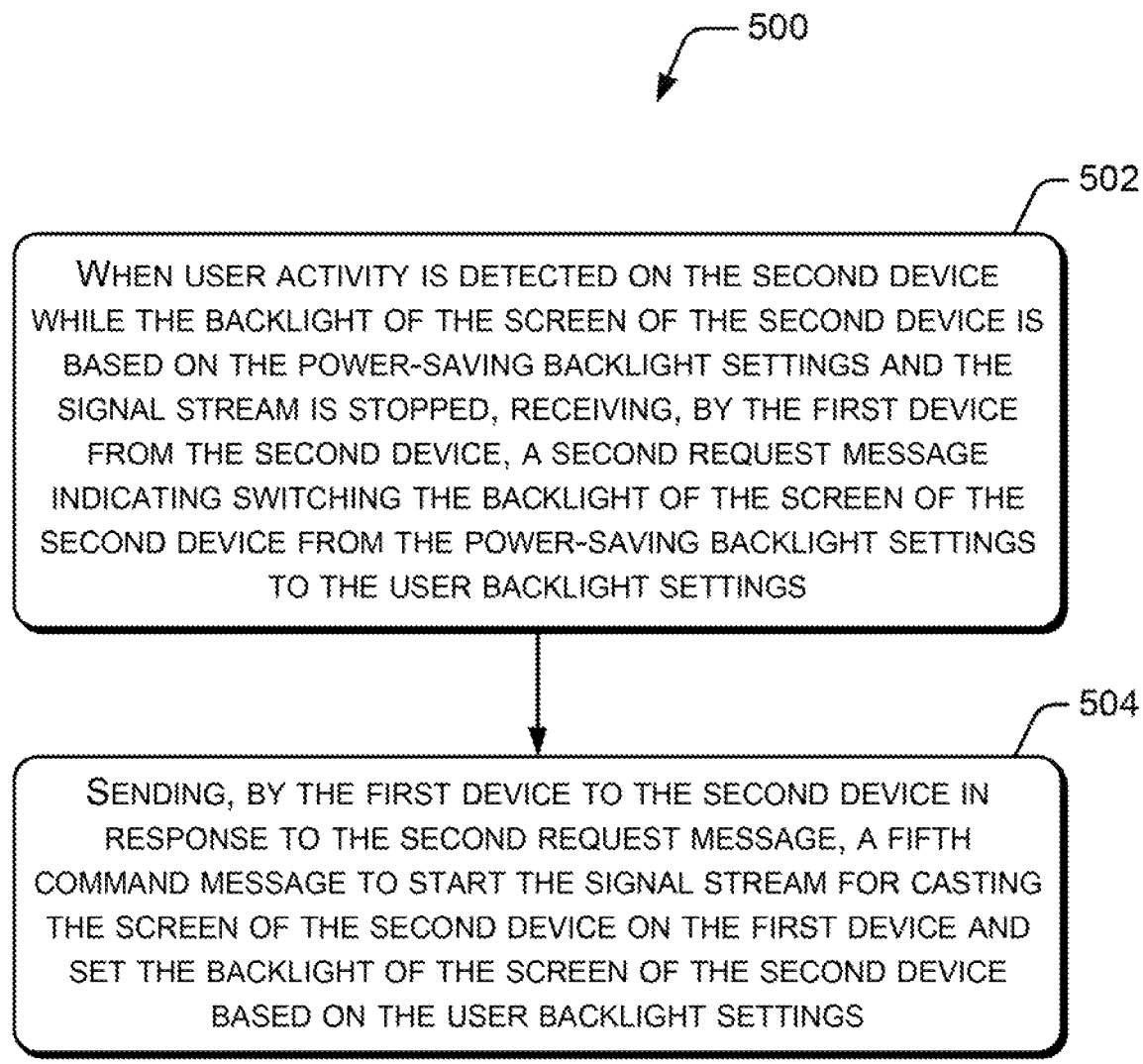
FIG. 5 illustrates a method of casting a screen, according to an example of the present subject matter.

Further, at block 406, when user activity is detected on the casted screen in the first device while the signal stream is stopped or paused based on the third command message, a fourth command message is sent by the first device to the second device. The fourth command message indicates to start the signal stream for casting the screen of the second device on the first device and to set the backlight of the screen of the second device based on the power-saving backlight settings. The fourth command message is similar to the first stream play command, as described earlier. The fourth command message is received by the second device, and accordingly the signal stream is re-started by the second device and the backlight of the screen of the second device is set to the power-saving backlight settings by the second device, FIG. 5 illustrates a method 500 of casting a screen, according to an example of the present subject matter. The method 500 can be implemented by processor(s) or device(s) through any suitable hardware, a non-transitory machine readable medium, or a combination thereof. Further, although the method 500 is described in context of the first device and the second device of FIG. 3 and FIG. 4, other suitable devices or systems may be used for execution of the method 500. In some example implementations, processes involved in the method 500 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 5, at block 502. Then user activity is detected on the second device while the backlight of the screen of the second device is based on the power-saving backlight settings and the signal stream is stopped or paused, a second request message is received by the first device from the second device. The second request message indicates switching the backlight of the screen of the second device from the power-saving backlight settings to the user backlight settings. The second request message is similar to the active mode request, as described earlier. At block 504, in response to the second request message, a fifth command message is sent by the first device to the second device. The fifth command message indicates to start the signal stream for casting the screen of the second device on the first device and to set the backlight of the screen of the second device based on the user backlight settings. The fifth command message is similar to the second stream play command, as described earlier. The fifth command message is received by the second device, and accordingly the signal stream is re-started by the second device and the backlight of the screen of the second device is, set to the user backlight settings by the second device.

Figure 6:
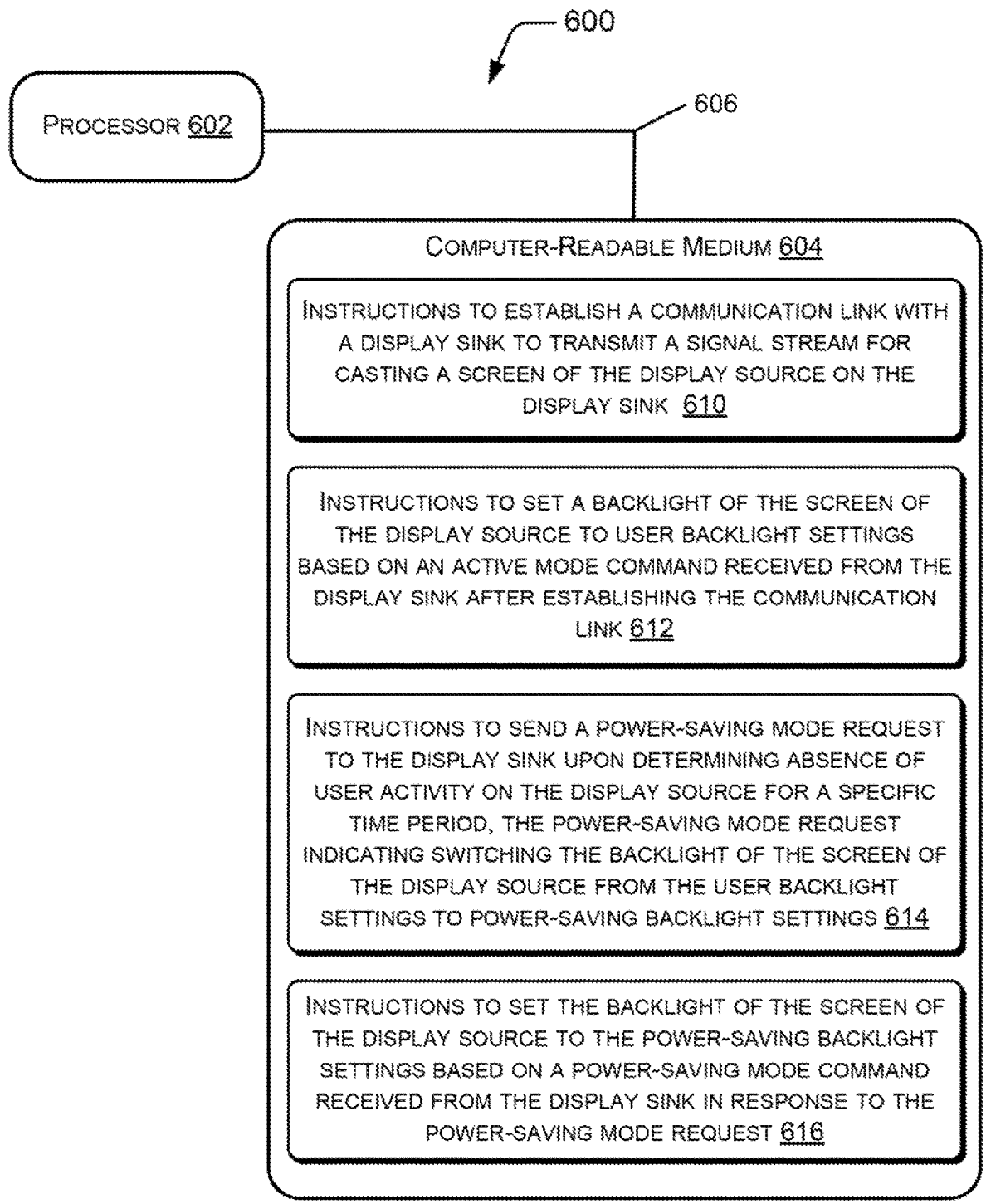
FIG. 6 illustrates a system environment implementing a non-transitory computer readable medium for casting a screen, according to an example of the present subject matter.

FIG. 6 illustrates a system environment 600 implementing a non-transitory computer readable medium for casting a screen, according to an example of the present subject matter. The system environment 600 includes a processor 602 communicatively coupled to the non-transitory computer-readable medium 604 through a communication link 606. In an example, the processor 602 may be a processing resource of a display source for fetching and executing computer-readable instructions from the non-transitory computer-readable medium 604. The display source may be the display source 102 as described with reference to FIG. 1.

The non-transitory computer-readable medium 604 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the processor 602 can access the non-transitory computer-readable medium 604 through a communication network (not shown).

In an example implementation, the non-transitory computer-readable medium 604 includes a set of computer-readable instructions for casting the screen 106 of the display source 102 on to the electronic device 100. The set of computer-readable instructions can be accessed by the processor 602 through the communication link 606 and subsequently executed to perform acts for casting the screen 106.

Referring to FIG. 6, in an example, the non-transitory computer-readable medium 604 may include instructions 610 to establish communication link with a display sink to transmit a signal stream for casting a screen of the display source on the display sink. The non-transitory computer-readable medium 604 may include instructions 612 to set a backlight of the screen of the display source to user backlight settings based on an active mode command received from the display sink after establishing the communication link. The non-transitory computer-readable medium 604 may include instructions 614 to send a power-saving mode request to the display sink upon determining absence of user activity on the display source for a specific time period. The power-saving mode request indicates switching the backlight of the screen of the display source from the user backlight settings to power-saving backlight settings. The non-transitory computer-readable medium 604 may include instructions 616 to set the backlight of the screen of the display source to the power-saving backlight settings based on a power-saving mode command received from the display sink in response to the power-saving mode request.

Further, in an example implementation, the non-transitory computer-readable medium 604 may include instructions to save the user backlight settings for the screen of the display source prior to setting the backlight to the power-saving backlight settings.

Further in n example implementation, the non-transitory computer-readable medium 604 may include instructions to determine presence of user activity on the display source while the backlight of the screen of the display source is based on the power-saving backlight settings. The non-transitory computer-readable medium 604 may include instructions to send an active mode request to the display sink based on the determination. The active mode request indicates switching the backlight of the screen of the display source from the power-saving backlight settings to the user backlight settings. The non-transitory computer-readable medium 604 may include instructions to set the backlight of the screen of the display source to the saved user backlight settings based on the active mode command received from the display sink in response to the active mode request.

Further, in an example implementation, the non-transitory computer-readable medium 604 may include instructions to receive a sleep mode command from the display sink, upon determining absence of user activity on the casted screen in the display sink for a specific time period and that a frame of the casted screen in the display sink is static, while the backlight of the screen of the display source is based on the power-saving backlight settings. The sleep mode command indicates stopping or pausing the signal stream from the display source. The non-transitory computer-readable medium 604 may include instructions to stop or pause the signal stream from the display source to the display sink in response to receiving the sleep mode command. The non-transitory computer-readable medium 604 may further include instructions to receive a stream play command from the display sink when user activity is detected on the casted screen in the display sink while the screen casting stream is stopped or paused based on the sleep mode command. The stream play command indicates starting the screen casting stream from the display source to the electronic device and setting the backlight of the screen of the display source based on the power-saving backlight settings. The non-transitory computer-readable medium 604 may include instructions to restart the signal stream from the display source to the display sink in response to receiving the stream play command.

Further in example implementation, the non-transitory computer-readable medium 604 may include instructions to determine presence of user activity on the display source while the backlight of the screen of the display source is based on the power-saving backlight settings and the signal stream is stopped or paused. The non-transitory computer-readable medium 604 may include instructions to send an active mode request to the display sink based on the determination. The active mode request indicates switching the backlight of the screen of the display source from the power-saving backlight settings to the user backlight settings. The non-transitory computer-readable medium 604 may include instructions to restart the signal stream from the display source to the display sink and set the backlight of the screen of the display source to the saved user backlight settings based on a stream play command received from the display sink in response to the active mode request.

Although examples for the present disclosure have been described in language specific to structural features and/or methods, it is to be understood that, the appended claims are not limited to the specific features or methods described herein. Rather, the specific features and methods are disclosed and explained as examples of the present disclosure.

We claim:

1. A method comprising:

establishing, by a first device having a screen, a communication link with a second device to receive a signal stream for casting a screen of the second device on the screen of the first device;

sending, by the first device to the second device upon establishing the communication link, a first command message to set a backlight of the screen of the second device based on user backlight settings;

receiving, by the first device from the second device when no user activity is detected on the second device for a specific time period, a first request message indicating switching the backlight of the screen of the second device from the user backlight settings to power-saving backlight settings; and sending, by the first device to the second device in response to the first request message, a second command message to set the backlight of the screen of the second device based on the power-saving backlight settings, wherein the first device continues to cast the signal stream from the second device, while the second device is in the power-saving backlight settings.

2. The method as claimed in claim 1, further comprising:

receiving, by the first device from the second device when user activity is detected on the second device, a second request message indicating switching the backlight of the screen of the second device from the power-saving backlight settings to the user backlight settings; and sending, by the first device to the second device in response to the second request message, the first command message to set the backlight of the screen of the second device based on the user backlight settings.

3. The method as claimed in claim 1, further comprising:

determining, by the first device, absence of user activity on the casted screen in the first device for a specific time period and that a frame of the casted screen in the first device is static, while the backlight of the screen of the second device is based on the power-saving backlight settings; and based on the determining, sending, by the first device to the second device, a third command message to stop the signal stream for casting the screen of the second device on the first device.

4. The method as claimed in claim 3, further comprising:

when user activity is detected on the casted screen in the first device while the signal stream is stopped based on the third command message, sending, by the first device to the second device, a fourth command message to start the signal stream for casting the screen of the second device on the first device and set the backlight of the screen of the second device based on the power-saving backlight settings.

5. The method as claimed in claim 3, further comprising:

when user activity is detected on the second device while the backlight of the screen of the second device is based on the power-saving backlight settings and the signal stream is stopped, receiving, by the first device from the second device, a second request message indicating switching the backlight of the screen of the second device from the power-saving backlight settings to the user backlight settings; and sending, by the first device to the second device in response to the second request message, a fifth command message to start the signal stream for casting the screen of the second device on the first device and set the backlight of the screen of the second device based on the user backlight settings.

6. An electronic device comprising:

a screen casting engine to transmit an active mode command to a display source, upon establishing a communication link with the display source for receiving a screen casting stream associated with a screen of the display source, the active mode command being indicative of setting a backlight of the screen of the display source based on user backlight settings;

a screen to display the screen casting stream from the display source; and a power management engine to:

receive a power-saving mode request from the display source when no user activity is detected on the display source for a specific time period, the power-saving mode request indicating switching the backlight of the screen of the display source from the user backlight settings to power-saving backlight settings; and transmit a power-saving mode command to the display source in response to the power-saving mode request, the power-saving mode command being indicative of setting the backlight of the screen of the display source based on the power-saving backlight settings, wherein the screen continues to cast the screen casting stream from the display source, while the display source is in the power-saving backlight settings.

7. The electronic device as claimed in claim 6, wherein the power management engine is to:

receive an active mode request from the display source when user activity is detected on the display source while the backlight of the screen of the display source is based on the power-saving backlight settings, the active mode request indicating switching the backlight of the screen of the display source from the power-saving backlight settings to the user backlight settings; and transmit the active mode command to the display source in response to the active mode request, to set the backlight of the screen of the display source based on the user backlight settings.

8. The electronic device as claimed in claim 6, wherein the power management engine is to:

transmit a sleep mode command to the display source, upon determining absence of user activity on the casted screen in the electronic device for a specific time period and that a frame of the casted screen in the electronic device is static, while the backlight of the screen of the display source is based on the power-saving backlight settings, the sleep mode command being indicative of stopping the screen casting stream from the display source.

9. The electronic device as claimed in claim 8, wherein the power management engine is to:

transmit a first stream play command to the display source when user activity is detected on the casted screen in the electronic device while the screen casting stream is stopped based on the sleep mode command, the first stream play command being indicative of starting the screen casting stream from the display source to the electronic device and setting the backlight of the screen of the display source based on the power-saving backlight settings.

10. The electronic device as claimed in claim 8, wherein the power management engine is to:

receive an active mode request from the display source when user activity is detected on the display source while the backlight of the screen of the display source is based on the power-saving backlight settings and the screen casting stream is stopped, the active mode request indicating switching the backlight of the screen of the display source from the power-saving backlight settings to the user backlight settings; and transmit a second stream play command to the display source in response to the active mode request, the second stream play command being indicative of starting the screen casting stream from the display source to the electronic device and setting the backlight of the screen of the display source based on the user backlight settings.

11. A non-transitory computer-readable medium comprising computer-readable instructions, which, when executed by a processor of a display source, cause the processor to:
   establish a communication link with a display sink to transmit a signal stream for casting a screen of the display source on a screen of the display sink;
   set a backlight of the screen of the display source to user backlight settings based on an active mode command received from the display sink after establishing the communication link;
   send a power-saving mode request to the display sink upon determining absence of user activity on the display source for a specific time period, the power-saving mode request indicating switching the backlight of the screen of the display source from the user backlight settings to power-saving backlight settings; and
   set the backlight of the screen of the display source to the power-saving backlight settings based on a power-saving mode command received from the display sink in response to the power-saving mode request, wherein the screen of the display sink continues to cast the signal stream from the display source, while the display source is in the power-saving backlight settings.

12. The non-transitory computer-readable medium as claimed in claim 11, wherein the instructions which, when executed by the processor, cause the processor to:
   save the user backlight settings for the screen of the display source prior to setting the backlight to the power-saving backlight settings.

13. The non-transitory computer-readable medium as claimed in claim 12, wherein the instructions which, when executed by the processor, cause the processor to:
   determine presence of user activity on the display source while the backlight of the screen of the display source is based on the power-saving backlight settings;
   based on the determination, send an active mode request to the display sink, the active mode request indicating switching the backlight of the screen of the display source from the power-saving backlight settings to the user backlight settings; and
   set the backlight of the screen of the display source to the saved user backlight settings based on the active mode command received from the display sink in response to the active mode request.

14. The non-transitory computer-readable medium as claimed in claim 12, wherein the instructions which, when executed by the processor, cause the processor to:
   receive a sleep mode command from the display sink, upon determining absence of user activity on the casted screen in the display sink for a specific time period and that a frame of the casted screen in the display sink is static, while the backlight of the screen of the display source is based on the power-saving backlight settings, the sleep mode command being indicative of stopping the signal stream from the display source; and
   stop the signal stream from the display source to the display sink in response to receiving the sleep mode command.

15. The non-transitory computer-readable medium as claimed in claim 14, wherein the instructions which, when executed by the processor, cause the processor to:
   determine presence of user activity on the display source while the backlight of the screen of the display source is based on the power-saving backlight settings and the signal stream is stopped;
   based on the determination, send an active mode request to the display sink, the active mode request indicating switching the backlight of the screen of the display source from the power-saving backlight settings to the user backlight settings; and
   restart the signal stream from the display source to the display sink and set the backlight of the screen of the display source to the saved user backlight settings based on a stream play command received from the display sink in response to the active mode request.

* * * * *